US012060126B2

(12) United States Patent
Zuo et al.

(10) Patent No.: US 12,060,126 B2
(45) Date of Patent: Aug. 13, 2024

(54) METHOD AND SYSTEM FOR MEASURING AND CALIBRATING STEERING PARAMETERS OF VEHICLE, MEDIUM AND AUTONOMOUS VEHICLE

(71) Applicants: Jiangsu XCMG Construction Machinery Research Institute Ltd., Suzhou (CN); XCMG Agricultural Equipment Technology Co., Ltd., Suzhou (CN)

(72) Inventors: Shuai Zuo, Suzhou (CN); Liang Gao, Suzhou (CN); Houxue Ma, Jiangsu (CN); Ming Chen, Suzhou (CN)

(73) Assignees: Jiangsu XCMG Construction Machinery Research Institute Ltd., Jiangsu (CN); XCMG Agricultural Equipment Technology Co., Ltd., Jiangsu (CN)

(*) Notice: Subject to any disclaimer, the term of this patent is extended or adjusted under 35 U.S.C. 154(b) by 342 days.

(21) Appl. No.: 17/703,101

(22) Filed: Mar. 24, 2022

(65) Prior Publication Data
US 2023/0182810 A1 Jun. 15, 2023

(30) Foreign Application Priority Data

Dec. 9, 2021 (CN) .......................... 202111501481.0

(51) Int. Cl.
*B62D 6/00* (2006.01)
*B62D 15/02* (2006.01)
(52) U.S. Cl.
CPC .......... *B62D 6/005* (2013.01); *B62D 15/0245* (2013.01); *B62D 15/025* (2013.01)
(58) Field of Classification Search
CPC ............................ B62D 6/005; B62D 15/025
See application file for complete search history.

(56) References Cited

U.S. PATENT DOCUMENTS 8,200,391 B2 * 6/2012 Sakugawa ............. B60T 8/1755
303/146
8,583,312 B2 11/2013 Schreiber
(Continued)

FOREIGN PATENT DOCUMENTS

CN 101039837 A 9/2007
CN 106769114 A 5/2017
(Continued)

OTHER PUBLICATIONS

Office Action for Chinese Patent Application No. 202111501481.0 (Jul. 28, 2022).

*Primary Examiner* — Long T Tran
(74) *Attorney, Agent, or Firm* — Merchant & Gould P.C.

(57) ABSTRACT

The present disclosure relates to a method and system for measuring and calibrating steering parameters of a vehicle, a medium and an autonomous vehicle. The method includes: calculating a steering angle of a front wheel of the vehicle corresponding to each sampling moment at a plurality of consecutive sampling moments respectively. The calculation process at each sampling moment includes: calculating a first calculated value based on a yaw velocity of the vehicle, a vehicle velocity and a wheelbase; calculating a second calculated value based on a vehicle velocity, a lateral acceleration of the vehicle and the wheelbase; calculating a third calculated value based on a rotating angle of the steering wheel and a steering gear ratio; and calculating a steering angle of the front wheel at a current sampling moment based on the first, second and third calculated value of the steering angle of the front wheel.

14 Claims, 2 Drawing Sheets

(56) References Cited

U.S. PATENT DOCUMENTS

Figure 1:
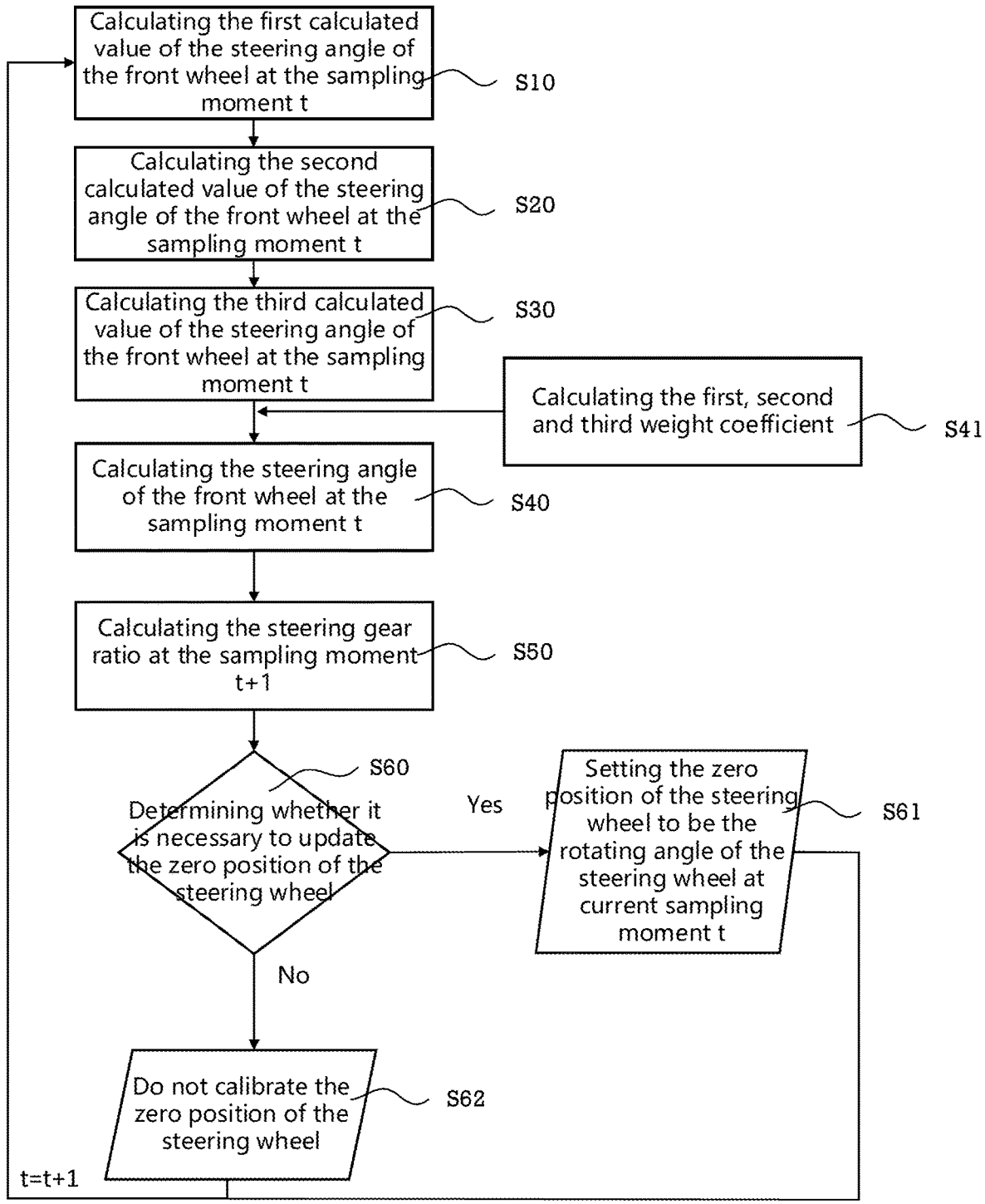

| | | | |
|---|---|---|---|
| 2009/0037053 A1* | 2/2009 | Yamazaki | B60W 10/14 |
| | | | 701/41 |
| 2012/0215406 A1* | 8/2012 | Tanimoto | B62D 15/025 |
| | | | 701/41 |
| 2013/0311045 A1* | 11/2013 | Tanimoto | B62D 5/0481 |
| | | | 701/42 |
| 2014/0297141 A1* | 10/2014 | Nihanda | B60K 23/0808 |
| | | | 701/58 |
| 2015/0112550 A1* | 4/2015 | Cho | B60G 17/0162 |
| | | | 701/38 |
| 2017/0137004 A1* | 5/2017 | Suzuki | B60T 8/175 |
| 2018/0086341 A1* | 3/2018 | Taniguchi | B62D 6/008 |
| 2018/0237004 A1* | 8/2018 | Nasu | B60K 17/354 |
| 2019/0009708 A1* | 1/2019 | Siegling | B60Q 1/085 |
| 2020/0207412 A1 | 7/2020 | Al Assad et al. | |
| 2021/0139016 A1* | 5/2021 | Horiguchi | B60W 50/0097 |

FOREIGN PATENT DOCUMENTS

| | | |
|---|---|---|
| CN | 107416021 A | 12/2017 |
| CN | 109649490 A | 4/2019 |
| CN | 112014122 A | 12/2020 |
| CN | 112455540 A | 3/2021 |
| CN | 113195342 A | 7/2021 |
| CN | 113602350 A | 11/2021 |
| JP | H08-85469 A | 4/1996 |
| JP | 2003-159966 A | 6/2006 |
| WO | 2009/129076 A2 | 10/2009 |
| WO | 2020/141423 A1 | 7/2020 |

\* cited by examiner

METHOD AND SYSTEM FOR MEASURING AND CALIBRATING STEERING PARAMETERS OF VEHICLE, MEDIUM AND AUTONOMOUS VEHICLE

CROSS-REFERENCE TO RELATED APPLICATIONS

The present application claims priority to China Patent Application No. 202111501481.0 filed on Dec. 9, 2021, the disclosure of which is incorporated by reference herein in its entirety.

TECHNICAL FIELD

The present disclosure relates to the technical field of vehicle driving, and in particular to a method and a system for measuring and calibrating steering parameters of a vehicle, a medium and an autonomous vehicle.

BACKGROUND

In recent years, although the technology of the autonomous vehicle has developed rapidly, the steering parameters are measured and calibrated by depending on frequent manual calibrations, which has problems such as low efficiency, large error, and high cost. During the use of the vehicle, due to the reasons such as mechanical wear and loose connection of the vehicle, the original calibration parameters vary, which results in an increase of the steering control errors of the autonomous vehicle during the traveling process, so that it is difficult to ensure the path tracking accuracy, and thus it is necessary to manually re-calibrate. Since the calibration is very frequent, the operation experience of the user is greatly affected.

In some related technologies, gyroscopes are mounted on the front wheel of the vehicle and the vehicle body respectively, and a steering wheel torque motor is mounted so as to calculate the steering angle of the front wheel by way of angular velocity integration.

SUMMARY

The inventors have found through studies that, in the related art, a gyro sensor is mounted on the wheel, so that the measurement method of the system is complicated; the steering angle of the front wheel is calculated by way of angular velocity integration, and the calibration result of the steering gear ratio and the zero position of the steering wheel are not output, so that the time-variant in the zero position of the steering wheel is omitted, the zero position of the steering wheel is not calibrated and the calculation result of the steering gear ratio is not output.

In view of this, the embodiments of the present disclosure provide a method and a system for measuring and calibrating steering parameters of a vehicle, a medium, and an autonomous vehicle, so as to obtain a steering angle of the front wheel more accurately and simplify the measurement mode.

In one aspect of the present disclosure, a method for measuring and calibrating steering parameters of a vehicle is provided. The method includes: calculating a steering angle of a front wheel of the vehicle corresponding to each sampling moment at a plurality of consecutive sampling moments respectively; wherein, a calculation process of the steering angle of a front wheel of the vehicle at each sampling moment comprises: calculating a first calculated value of the steering angle of the front wheel based on a yaw velocity of the vehicle, a vehicle velocity and a wheelbase between front wheels and rear wheels of the vehicle; calculating a second calculated value of the steering angle of the front wheel based on the vehicle velocity, a lateral acceleration of the vehicle and the wheelbase between front wheels and rear wheels of the vehicle; calculating a third calculated value of the steering angle of the front wheel based on a rotating angle of a steering wheel and a steering gear ratio; and calculating a steering angle of the front wheel at a current sampling moment based on the first calculated value of the steering angle of the front wheel, the second calculated value of the steering angle of the front wheel, and the third calculated value of the steering angle of the front wheel.

In some embodiments, a calculation formula of the steering angle of the front wheel at the current sampling moment is:

$$\delta_t = \delta_{t-1} + w_\theta \cdot (\delta_\theta - \delta_{t-1}) + W_a \cdot (\delta_a - \delta_{t-1}) + W\omega \cdot (\delta_\omega - \delta_{t-1});$$

where $\delta_t$ is the steering angle of the front wheel corresponding to the current sampling moment t, $\delta_{t-1}$ is the steering angle of the front wheel at a previous sampling moment $t-1$, $\delta_\omega$ is the first calculated value of the steering angle of the front wheel, $\delta_a$ is the second calculated value of the steering angle of the front wheel, $\delta_\theta$ is the third calculated value of the steering angle of the front wheel, $w_\omega$ is a first weighting coefficient, $w_a$ is a second weighting coefficient, and $w_\theta$ is a third weighting coefficient.

In some embodiments, the first weighting coefficient, the second weighting coefficient, and the third weighting coefficient are all obtained by calculation based on inherent parameters of a vehicle yaw velocity sensor for detecting the yaw velocity of the vehicle, a vehicle lateral acceleration sensor for detecting the lateral acceleration of the vehicle, and a steering wheel rotating angle sensor for detecting the rotating angle of the steering wheel.

In some embodiments, calculation formulas of the first weighting coefficient, the second weighting coefficient, and the third weighting coefficient are respectively:

$$w_\omega = \frac{S_\omega / \omega_{max}}{S_\omega / \omega_{max} + S_a / a_{max} + S_\theta / \theta_{max}};$$

$$w_a = \frac{S_a / a_{max}}{S_\omega / \omega_{max} + S_a / a_{max} + S_\theta / \theta_{max}};$$

$$w_\theta = \frac{S_\theta / \theta_{max}}{S_\omega / \omega_{max} + S_a / a_{max} + S_\theta / \theta_{max}};$$

where $S_\omega$ is a measurement standard deviation of the vehicle yaw velocity sensor, $\omega_{max}$ is a maximum absolute measurement value of the vehicle yaw angle sensor, $S_a$ is a measurement standard deviation of the vehicle lateral acceleration sensor, $a_{max}$ is a maximum absolute measurement value of the vehicle lateral acceleration sensor, $S_\theta$ is a measurement standard deviation of the steering wheel rotating angle sensor, and $\theta_{max}$ is a maximum absolute measurement value of the steering wheel rotating angle sensor.

In some embodiments, calculation formulas of the first calculated value of the steering angle of the front wheel, the second calculated value of the steering angle of the front wheel, and the third calculated value of the steering angle of the front wheel are respectively:

$$\delta_\omega = \arctan\left(\frac{\omega L}{v}\right);$$

-continued $$\delta_a = \arctan\left(\frac{aL}{v^2}\right);$$

$$\delta_\theta = \frac{\theta}{i};$$

where $\delta_\omega$ is the first calculated value of the steering angle of the front wheel, co is the yaw velocity of the vehicle, L is the wheelbase between front wheels and rear wheels of the vehicle, v is the vehicle velocity, $\delta_a$ is the second calculated value of the steering angle of the front wheel, a is the lateral acceleration of the vehicle, $\delta_\theta$ is the third calculated value of the steering angle of the front wheel, θ is the rotating angle of the steering wheel, and i is the steering gear ratio.

In some embodiments, after obtaining the steering angle of the front wheel corresponding to the current sampling moment t at each sampling moment, and the method further comprises: performing updated calculation on the steering gear ratio for the next sampling moment t+1, wherein an updated calculation formula of the steering gear ratio is:

$$i_{t+1} = \frac{\sum_{n=1}^{t} |\theta_n - \theta_{n-1}|}{\sum_{n=1}^{t} |\delta_n - \delta_{n-1}|};$$

where it+1 is the steering gear ratio at the next sampling moment t+1, n is a moment at any sampling moment, and n=1, 2, ..., t, $\delta_n$ is the steering angle of the front wheel corresponding to the sampling moment n, $\delta_{n-1}$ is the steering angle of the front wheel corresponding to the sampling moment n−1, $\theta_n$ is the steering wheel rotating angle at the sampling moment n, and $\theta_{n-1}$ is the steering wheel rotating angle at the sampling moment n−1.

In some embodiments, at each sampling moment, the method further includes: determining whether to perform calibration operation on a zero position of the steering wheel; setting the rotating angle of the steering wheel at the current sampling moment as the zero position of the steering wheel if the following formula is satisfied when the vehicle is in a traveling state:

$$\begin{cases} \omega_t \times \omega_{t-1} \leq 0 \\ a_t \times a_{t-1} \leq 0 \\ |\theta_t - \theta_{t-1}| > 0 \end{cases};$$

where $\omega_t$ is the yaw velocity of the vehicle at the current sampling moment t, $\omega_{t-1}$ is the yaw velocity of the vehicle at the previous sampling moment t−1, $a_t$ is the lateral acceleration of the vehicle at the current sampling moment t, $a_{t-1}$ is the lateral acceleration of the vehicle at the previous sampling moment t−1, $\theta_t$ is the rotating angle of the steering wheel at the current sampling moment t, and $\theta_{t-1}$ is the rotating angle of the steering wheel at the previous sampling moment t−1.

In some embodiments, the first weighting coefficient, the second weighting coefficient and the third weighting coefficient are all obtained by training a neural network model.

In some embodiments, in the neural network model, initial values of the first weighting coefficient, the second weighting coefficient, and the third weighting coefficient are determined by calculation based on inherent parameters of a vehicle yaw velocity sensor for detecting the yaw velocity of the vehicle, a vehicle lateral acceleration sensor for detecting the lateral acceleration of the vehicle, and a steering wheel rotating angle sensor for detecting the steering angle of the steering.

In another aspect of the present disclosure, a system for measuring and calibrating steering parameters of a vehicle is provided. The system includes: a vehicle velocity sensor, a steering wheel rotating angle sensor, a vehicle lateral acceleration sensor and a vehicle yaw velocity sensor; a memory; and a processor signally connected to the memory, the vehicle velocity sensor, the steering wheel rotating angle sensor, the vehicle lateral acceleration sensor, and the vehicle yaw velocity sensor, and configured to implement the method for measuring and calibrating steering parameters of a vehicle described above based on instructions stored in the memory.

In some embodiments, the vehicle lateral acceleration sensor and the vehicle yaw velocity sensor are implemented by an inertial measurement unit.

In some embodiments, the processor is signally connected to the inertial measurement unit, the vehicle velocity sensor and the steering wheel rotating angle sensor through a Controller Area Network bus.

In yet another aspect of the present disclosure, a computer-readable storage medium having a computer program stored thereon is provided, wherein the program when executed by a processor implements any method for measuring and calibrating steering parameters of a vehicle described above.

In still another aspect of the present disclosure, an autonomous vehicle is provided. The vehicle includes: any system for measuring and calibrating steering parameters of a vehicle described above.

Therefore, according to the embodiments of the present disclosure, the calculated values of the steering angle of the front wheel at each sampling moment is calculated from a plurality of view angles such as the vehicle velocity and the yaw velocity of the vehicle, the lateral acceleration of the vehicle and the rotating angle of the steering wheel, the steering angle of the front wheel corresponding to the sampling moment is further calculated based on these calculated values. Compared with the related art, there is no need to mount a gyro sensor on the wheel, which simplifies the measurement structure. Moreover, the calculation of the steering angle of the front wheel also incorporates the influences of various factors such as the vehicle velocity, the yaw velocity of the vehicle, the lateral acceleration of the vehicle and the rotating angle of the steering wheel, so that the accuracy of the calculated steering angle of the front wheel is higher. In addition, real-time dynamic calculation and update are performed for the parameter of the steering angle of the front wheel at any sampling moment, so that special conditions and manual participation are not required, which not only reduces the cost but also improves the efficiency and the environmental adaptability.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

Figure 2:
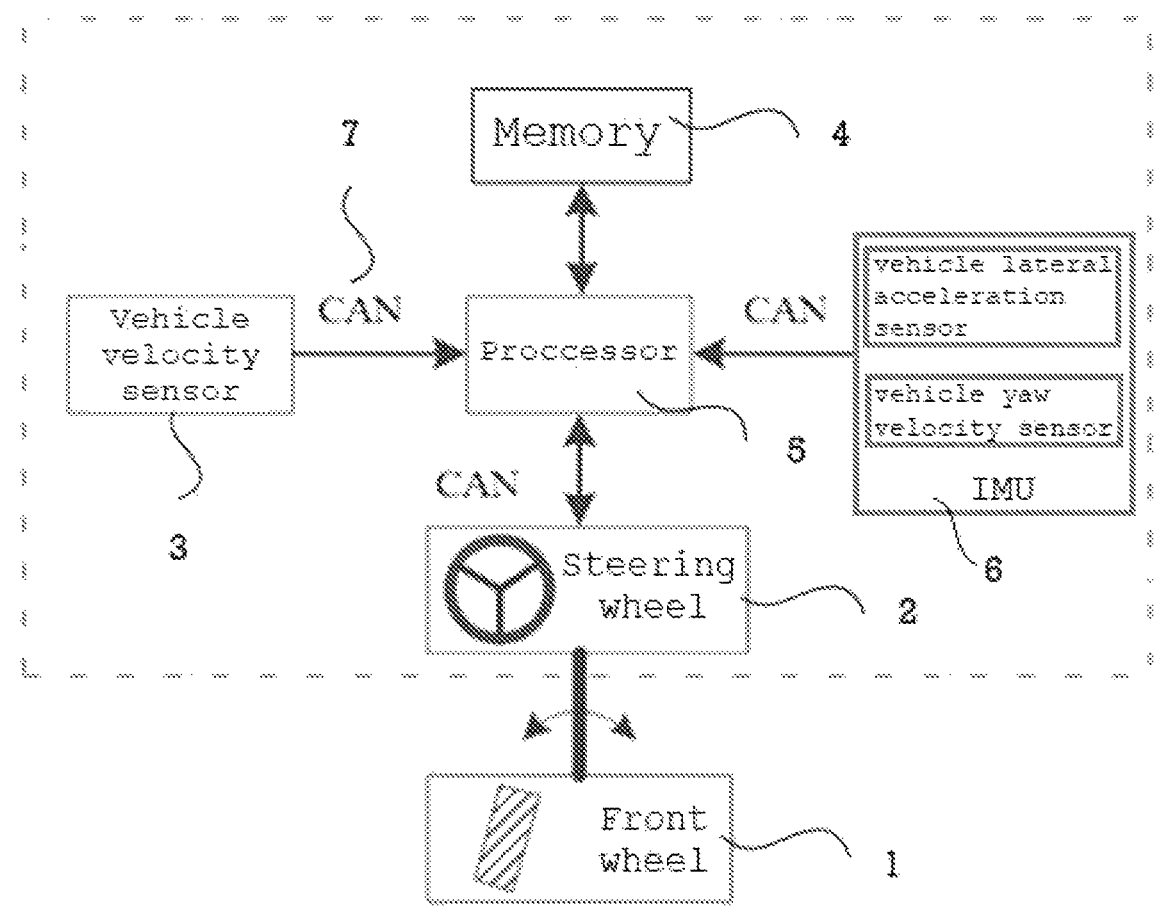

The present disclosure may be more explicitly understood from the following detailed description with reference to the accompanying drawings, in which:

FIG. 1 is a flowchart of a method for measuring and calibrating steering parameters according to some embodiments of the present disclosure; and FIG. 2 is a schematic structural view of a measurement and calibration system according to some embodiments of the present disclosure.

It should be understood that the dimensions of various parts shown in the accompanying drawings are not drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In some related technologies, a gyro is mounted on the front wheel of the vehicle and the vehicle body respectively, and a steering wheel torque motor is mounted so as to calculate the steering angle of the front wheel by way of angular velocity integration. The inventors have found through studies that, in the related art, a gyro sensor is mounted on the wheel, so that the measurement method of the system is complicated; and there is a cumulative error in calculating the steering angle of the front wheel by way of angular velocity integration, and there is no output of the calibration result of the steering gear ratio and the zero position of the steering wheel, so that the time-variant in the zero position of the steering wheel is omitted, the zero position of the steering wheel is not calibrated and no calculation result of the steering gear ratio is outputted.

In view of this, the embodiments of the present disclosure provide a method and system for measuring and calibrating steering parameters of a vehicle, a medium, and an autonomous vehicle, so as to obtain a steering angle of the front wheel more accurately and simplify the measurement method.

FIG. 1 is a flowchart of a method for measuring and calibrating steering parameters according to some embodiments of the present disclosure. Referring to FIG. 1, the present disclosure provides an embodiment of a method for measuring and calibrating steering parameter of a vehicle. The method includes: calculating the steering angle of the front wheel of the vehicle corresponding to each sampling moment at a plurality of consecutive sampling moments respectively, wherein the calculation process of the steering angle of the front wheel of the vehicle at each sampling moment includes: step S10 to step S40. During the process of implementing the method for measuring and calibrating steering parameters of a vehicle, steps S10 to S40 are performed in each sampling cycle. The sequence of step S10, step S20, and step S30 may be interchanged with each other, and may also be performed simultaneously. Step S40 is performed after step S10, step S20, and step S30.

In step S10, the first calculated value of the steering angle of the front wheel is calculated based on the yaw velocity of the vehicle, the vehicle velocity, and the wheelbase between the front wheels and rear wheels of the vehicle. The yaw velocity of the wheel refers to the angular velocity of the vehicle rotating about an axle perpendicular to the ground. The vehicle velocity refers to the velocity of the vehicle along the traveling direction. The wheelbase between the front wheels and rear wheels of the vehicle refers to the distance between the front axle and rear axle of the vehicle.

In step S20, based on the vehicle velocity, the lateral acceleration of the vehicle and the wheelbase between the front wheels and rear wheels of the vehicle, a second calculated value of the steering angle of the front wheel is calculated. The lateral acceleration of the vehicle refers to the acceleration along the direction perpendicular to the traveling direction of the vehicle.

In step S30, based on the rotating angle of the steering wheel angle and the steering gear ratio, a third calculated value of the steering angle of the front wheel is calculated. The steering wheel angle refers to the rotating angle of the steering wheel 2, and the steering gear ratio refers to the ratio of the vehicle steering wheel rotating angle to the steering angle of the front wheel.

In step S40, the front wheel steering angle at the current sampling moment is calculated based on the first calculated value of the steering angle of the front wheel, the second calculated value of the steering angle of the front wheel, and the third calculated value of the steering angle of the front wheel.

In this embodiment, the calculated values of the steering angle of the front wheel at each sampling moment is calculated from a plurality of view angles such as the vehicle velocity and the yaw velocity of the vehicle, the lateral acceleration of the vehicle and the rotating angle of the steering wheel, the steering angle of the front wheel corresponding to the sampling moment is further calculated based on these calculated values. Compared with the related art, there is no need to mount a gyro sensor on the wheel, which simplifies the measurement structure. Moreover, the calculation of the steering angle of the front wheel also incorporates the influences of various factors such as the vehicle velocity, the yaw velocity of the vehicle, the lateral acceleration of the vehicle and the rotating angle of the steering wheel, so that the accuracy of the calculated steering angle of the front wheel is higher. In addition, real-time dynamic calculation and update are performed for the parameter of the steering angle of the front wheel at any sampling moment, so that special conditions and manual participation are not required, which not only reduces the cost but also improves the efficiency and the environmental adaptability.

In some embodiments, the calculation formula of the steering angle of the front wheel at the current sampling moment in step S40 is:

$$\delta_t = \delta_{t-1} + w_\theta \cdot (\delta_\theta - \delta_{t-1}) + W_a \cdot (\delta_a - \delta_{t-1}) + W\omega \cdot (\delta_\omega - \delta_{t-1});$$

where $\delta_t$ is the steering angle of the front wheel corresponding to the current sampling moment t, $\delta_{t-1}$ is the steering angle of the front wheel at the previous sampling moment t−1, is the first calculated value of the steering angle of the front wheel, $\delta_a$ is the second calculated value of the steering angle of the front wheel, $\delta_\theta$ is the third calculated value of the steering angle of the front wheel, $w_\omega$ is the first weighting coefficient, $w_a$ is the second weighting coefficient, and $w_\theta$ is the third weighting coefficient.

In this embodiment, weighted calculation is performed on the differences obtained by respectively subtracting the steering angle of the front wheel at the previous sampling moment from the first calculated value of the steering angle of the front wheel, the second calculated value of the steering angle of the front wheel and the third calculated value of the steering angle of the front wheel at the current sampling moment. Then, the weighted result is added to the steering angle of the front wheel at the previous sampling moment, and the value thus obtained serves as the steering angle of the front wheel at the current sampling moment. In this way, when the steering angle of the front wheel at each sampling moment is calculated, the variation in the steering angle of the front wheel at the previous sampling moment is integrated with the difference between each of the calculated values of the three steering angles of the front wheels at the current sampling moment and the same, so as to achieve continuous correction of the steering angle of the front wheel based on the previous sampling moment, and eliminate the cumulative errors in the calculation of the steering angle of the front wheel as much as possible, thereby realizing the dynamic measurement and calculation of the steering angle of the front wheel in real time and improving the calculation accuracy of the steering angle of the front wheel.

Referring to FIG. 1, step S41 is the calculation of the first weighting coefficient, the second weighting coefficient, and the third weighting coefficient. In some embodiments, step S41 includes obtaining the first weighting coefficient, the second weighting coefficient, and the third weighting coefficient based on the inherent parameters of a vehicle yaw velocity sensor for detecting a yaw velocity of the vehicle, a vehicle lateral acceleration sensor for detecting a lateral acceleration of the vehicle, and a steering wheel rotating angle sensor for detecting a rotating angle of the steering wheel.

For example, the calculation formulas of the first weighting coefficient, the second weighting coefficient, and the third weighting coefficient may be respectively:

$$W_\omega = \frac{S_\omega/\omega_{max}}{S_\omega/\omega_{max} + S_a/a_{max} + S_\theta/\theta_{max}};$$

$$W_a = \frac{S_a/a_{max}}{S_\omega/\omega_{max} + S_a/a_{max} + S_\theta/\theta_{max}};$$

$$W_\theta = \frac{S_\theta/\theta_{max}}{S_\omega/\omega_{max} + S_a/a_{max} + S_\theta/\theta_{max}};$$

where $S_\omega$ is the measurement standard deviation of the vehicle yaw velocity sensor, $\omega_{max}$ is the maximum absolute measurement value of the vehicle yaw angle sensor, $S_a$ is the measurement standard deviation of the vehicle lateral acceleration sensor, $a_{max}$ is the maximum absolute measurement value of the vehicle lateral acceleration sensor, $S_\theta$ is the measurement standard deviation of the steering wheel rotating angle sensor, and $\theta_{max}$ is the maximum absolute measurement value of the steering wheel rotating angle sensor. The measurement standard deviation here can reflect the inherent measurement accuracy of the sensor, and the maximum absolute measurement value corresponds to the measurement range of the sensor and reflects the sensitivity of the sensor.

In this embodiment, the inherent characteristics of the sensors corresponding to the yaw velocity of the vehicle, the vehicle lateral acceleration, and the rotating angle of the steering wheel are integrated, more really reflect the time-variant of the parameters of the steering system due to the external environment, and eliminate the influence of the average parameters on the accuracy.

In other embodiments, the first weighting coefficient, the second weighting coefficient, and the third weighting coefficient may also be obtained by training a neural network model. For example, the input of the model is set to be $\delta_w$, $\delta_a$ and $\delta_\theta$, and the output of the model is set to be $w_\omega$, $w_a$ and $w_\theta$. In combination with the steering angle $\delta_{t-1}$ of the front wheel determined at the previous sampling moment, the predicted value $\delta_t$ of the steering angle of the front wheel at the current sampling moment is calculated, and the deviation between the real value $\delta_{real}$ of the steering angle of the front wheel and the predicted steering angle value $\delta_t$ is calculated by the Loss function, so as to update the network model parameters by reverse transfer of the neural network. After repeated iterative training, the neural network model converges, so as to finally obtain the optimal $w_\omega$, $w_a$ and $w_\theta$.

In order to further improve the convergence rate of the neural network model, in some embodiments, in the neural network model, the initial values of the first weighting coefficient, the second weighting coefficient, and the third weighting coefficient may be determined based on the inherent parameters of a vehicle yaw velocity sensor for detecting a yaw velocity of the vehicle, a vehicle lateral acceleration sensor for detecting a lateral acceleration of the vehicle, and a steering wheel rotating angle sensor for detecting a rotating angle of the steering wheel.

The calculation process of the three calculated values of the steering angle of the front wheel in the foregoing steps S10, S20, and S30 may be derived by the following method.

According to the steering motion model of vehicle, it is obtained that:

$$\begin{cases} \tan\delta = \dfrac{L}{R} \\ \omega = \dfrac{v}{R} \end{cases};$$

where $\delta$ is the steering angle of the front wheel, L is the wheelbase between the front wheels and rear wheels of the vehicle, R is the turning radius of the vehicle, w is the yaw velocity of the vehicle, and v is the velocity of the vehicle.

From the above formula, it may be obtained that the first calculated value of the steering angle of the front wheel is:

$$\delta_\omega = \arctan\left(\dfrac{\omega L}{v}\right).$$

According to the relationship between the lateral acceleration of the vehicle and the turning radius of the vehicle, it is obtained that:

$$\begin{cases} \tan\delta = \dfrac{L}{R} \\ a = \dfrac{v^2}{R} \end{cases};$$

where a is the lateral acceleration of the vehicle.

From the above formula, it may be obtained that the second calculated value of the steering angle of the front wheel is:

$$\delta_a = \arctan\left(\dfrac{aL}{v^2}\right).$$

Based on the rotating angle of the steering wheel, the third calculated value of the steering angle of the front wheel is:

$$\delta_\theta = \dfrac{\theta}{i};$$

where $\theta$ is the rotating angle of the steering wheel, and i is the steering gear ratio.

In this embodiment, based on the kinematic relationship of the vehicle, the expression of the corresponding steering angle of the front wheel is determined according to different kinematic parameters, which not only considers the static structural parameters of the vehicle but also combines the kinematic parameters that vary in real time during the traveling process, so that the calculation accuracy of the steering angle of the front wheel is higher.

Referring to FIG. 1, in some embodiments, after the steering angle of the front wheel corresponding to the current sampling moment t is obtained in step S40 at each sampling moment, step S50 is further included. In step S50, updated calculation is performed on the steering gear ratio for the next sampling moment t+1, wherein the updated calculation formula of the steering gear ratio is:

$$i_{t+1} = \dfrac{\sum_{n=1}^{t} |\theta_n - \theta_{n-1}|}{\sum_{n=1}^{t} |\delta_n - \delta_{n-1}|};$$

where $i_{t+1}$ is the steering gear ratio at the next sampling moment t+1, n is a moment at any sampling moment, n=1, 2, . . . , t, $\delta_n$ is the steering angle of the front wheel corresponding to the sampling moment n, $\delta_{n-1}$ is the steering angle of the front wheel corresponding to the sampling moment n−1, $\theta_n$ is the steering wheel steering angle at the sampling moment n, and $\theta_{n-1}$ is the steering wheel rotating angle at the sampling moment n−1.

For example, at the sampling moment t=10, the steering gear ratio $i_{11}$ is obtained based on the values of the rotating angle of the steering wheel and the calculated values of the steering angle of the front wheel at the sampling moments t=10 and t=1, 2, . . . , 9, so that the third calculated value of the steering angle of the front wheel is:

$$\delta_\theta = \dfrac{\theta}{i_{11}}.$$

In this embodiment, the steering gear ratio is calibrated after the steering angle of the front wheel at each sampling moment is calculated, thereby improving the calculation accuracy of the third calculated value of the steering angle of the front wheel at the next sampling moment. In this way, dynamic calibration is performed on the steering gear ratio in real time, so that the time-variant of the parameters of the steering system due to the external environment is really reflected, and the influence on the accuracy of the average parameters is eliminated, thereby improving the calculation accuracy of the steering angle of the front wheel as a whole.

Referring to FIG. 1, in some embodiments, at each sampling moment, there further includes: step S60. In step S60, it is determined whether to perform calibration operation on the zero position of the steering wheel. If the following formula is satisfied when the vehicle is in a traveling state, step S61 is performed. In step S61, the rotating angle of the steering wheel at the current sampling moment is set as the zero position of the steering wheel:

$$\begin{cases} \omega_t \times \omega_{t-1} \leq 0 \\ a_t \times a_{t-1} \leq 0 \\ |\theta_t - \theta_{t-1}| > 0 \end{cases};$$

where $\omega_t$ is the yaw velocity of the vehicle at the current sampling moment t, $\omega_{t-1}$ is the yaw velocity of the vehicle at the previous sampling moment t−1, $a_t$ is the lateral acceleration of the vehicle at the current sampling moment t, $a_{t-1}$ is the lateral acceleration of the vehicle at the previous sampling moment t−1, $\theta_t$ is the rotating angle of the steering wheel at the current sampling moment t, and $\theta_{t-1}$ is the rotating angle of the steering wheel at the previous sampling moment t−1.

In step S60, if the above formula is not satisfied when the vehicle is in a traveling state, step S62 is performed, wherein the zero position of the steering wheel is not calibrated in step S62. The rotating angle of the steering wheel at each sampling moment may be further determined based on the rotating angle of the steering wheel detected by the sensor and the calibrated zero position of the steering wheel.

As shown in FIG. 1, the method for measuring and calibrating steering parameters of a vehicle in the present disclosure includes: first calculating the steering angle of the front wheel based on the wheelbase between the front wheels and rear wheels of the vehicle, the inherent parameters of each sensor, as well as the vehicle velocity, the yaw velocity of the vehicle, the lateral acceleration of the vehicle, and the rotating angle of the steering wheel at the current sampling moment t; then calculating the steering gear ratio based on the steering angle of the front wheel and the rotating angle of the steering wheel at the sampling moment t and at all sampling moments before the sampling moment t, for obtaining the third calculated value of the steering angle of the front wheel at the sampling moment t+1; then determining whether the zero position of the steering wheel is passed based on the yaw velocity of the vehicle, the lateral acceleration of the vehicle, and the rotating angle of the steering wheel at the moment t and at the sampling moment t−1 during the traveling process of the vehicle. If the zero position is passed, the rotating angle of the steering wheel at the sampling moment t is taken as the zero position of the steering wheel angle, and if the zero position is not passed, there is no need to update the value of the zero position of the steering wheel. The measurement and calibration of the steering parameters at the sampling moment t+1 are performed as the above-described method, where t may be any sampling moment during the traveling process of the vehicle.

In this embodiment, whether the zero position of the steering wheel is passed is examined at each sampling moment, and the zero position of the steering wheel is calibrated in time, thereby improving the detection accuracy of the rotating angle of the steering wheel. In this way, dynamic calibration is performed on the zero position of the steering wheel in real time, so that the time-variant of the parameters of the steering system due to the external environment is really reflected, and the influence of the average parameters on the accuracy is eliminated, thereby improving the calculation accuracy of the steering angle of the front wheel as a whole.

FIG. 2 is a schematic structural view of a measurement and calibration system according to some embodiments of the present disclosure. Referring to FIG. 2, the present disclosure also provides an embodiment of a system for measuring and calibrating steering parameters of a vehicle. The system includes: a vehicle velocity sensor 4, a steering wheel rotating angle sensor 2, a vehicle lateral acceleration sensor and a vehicle yaw velocity sensor, a memory 4, and a processor 5. The processor 5 is signally connected to the memory 4, the vehicle velocity sensor 4, the steering wheel rotating angle sensor 2, the vehicle lateral acceleration sensor, and the vehicle yaw velocity sensor, and configured to implement the method for measuring and calibrating steering parameters of a vehicle according to any one of the previous embodiments based on the instructions stored in the memory 4.

Referring to FIG. 2, in some embodiments, the vehicle lateral acceleration sensor and the vehicle yaw velocity sensor are implemented by an inertial measurement unit (referred to as IMU) 6. In other embodiments, the vehicle lateral acceleration sensor and the vehicle yaw velocity sensor may be separately provided respectively.

Referring to FIG. 2, in some embodiments, the processor 5 is signally connected to the inertial measurement unit 6, the vehicle velocity sensor 4, and the steering wheel rotating angle sensor 2 through a controller area network (referred to as CAN) bus 7.

The processor 5 described here may include a general-purpose processor, a digital signal processor (DSP), an application specific integrated circuit (ASIC), a field programmable gate array (FPGA) or other programmable logic devices, discrete gate or transistor logics, discrete hardware components, or any combination thereof designed to perform the functions described herein, so as to implement or perform the functions. The general-purpose processor may be a microprocessor, but in an alternative solution, the processor 5 may be any conventional processor, controller, microcontroller, or state machine. The processor 5 may also be implemented as a combination of computing devices, for example a combination of a DSP and a microprocessor, a plurality of microprocessors, one or more microprocessors cooperating with a DSP core, or any other such configuration.

The steps of the method or algorithm described in combination with the embodiments disclosed herein may be directly embodied in hardware, in a software module executed by the processor 5, or in a combination thereof. The software module may reside in RAM memory, flash memory, ROM memory, EPROM memory, EEPROM memory, register, hard disk, removable disk, CD-ROM, or any other form of storage medium known in the art.

In yet another aspect of the present disclosure, a computer-readable storage medium stored with a computer program thereon is provided, wherein the program when executed by the processor 5 implements the method for measuring and calibrating steering parameters of a vehicle according to any one of the foregoing embodiments.

In one or more exemplary embodiments, the described functions may be implemented in hardware, software, firmware, or any combination thereof. If implemented as a computer program product in software, each function may be stored as one or more instructions or codes on a computer-readable medium or transferred by the same. The computer-readable medium which includes both a computer storage medium and a communication medium, includes any medium that facilitates the transfer of a computer program from one place to another. The storage medium may be any available medium that can be accessed by a computer. As an example rather than a limitation, such computer-readable medium may include RAM, ROM, EEPROM, CD-ROM or other optical disk storage, magnetic disk storage or other magnetic storage devices, or any other medium that can be used to carry or store agreement program codes in the structural form of instructions or data and can be accessed by a computer. Any connection is also appropriately referred to as a computer-readable medium. For example, if the software is transferred from a web site, a server, or other remote sources using coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of the medium. The disk and the disc as used herein include compact disc (CD), laser disc, optical disc, digital versatile disc (DVD), floppy disk and Blu-ray disc, wherein the disk often reproduces data in a magnetic manner, and the disc reproduces data using laser in an optical manner. The above-described combination should also be included within the scope of a computer-readable medium.

In still another aspect of the present disclosure, an autonomous vehicle is provided, which includes the system for measuring and calibrating steering parameters of a vehicle according to any of the foregoing embodiments.

As shown in FIG. 2, the measurement and calibration system of the autonomous vehicle includes a processor 5, an IMU 6, a vehicle velocity sensor 4, and a steering wheel rotating angle sensor 2. The processor 5 is connected to the IMU 6, the vehicle velocity sensor 4, and the steering wheel rotating angle sensor 2 through the CAN bus 7. The steering wheel is connected to the front wheel 1 through the steering mechanism, wherein all the components constituting the system are requisite configurations for the autonomous vehicle, so that there is no need to add other measuring instruments, which reduces the testing cost.

Compared with the problems such as low efficiency, large error and high cost in the measurement and calibration of the steering parameters of the autonomous vehicle in the related art, the autonomous vehicle of the present disclosure which has abundant functions, can accomplish the calculation or calibration of a plurality of key parameters. In some embodiments of the present disclosure, the autonomous vehicle may perform real-time calculation on the steering angle of the front wheel at each sampling moment, and update the steering gear ratio in real time, and can also automatically calibrate the rotating angle of the steering wheel, thereby improving the measurement accuracy.

Hereto, various embodiments of the present disclosure have been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A method for measuring and calibrating steering parameters of a vehicle, comprising:
    calculating a steering angle of a front wheel of the vehicle corresponding to each sampling moment at a plurality of consecutive sampling moments respectively;
    wherein, a calculation process of the steering angle of a front wheel of the vehicle at each sampling moment comprises:
    calculating a first calculated value of the steering angle of the front wheel based on a yaw velocity of the vehicle, a vehicle velocity and a wheelbase between front wheels and rear wheels of the vehicle;
    calculating a second calculated value of the steering angle of the front wheel based on the vehicle velocity, a lateral acceleration of the vehicle and the wheelbase between front wheels and rear wheels of the vehicle;
    calculating a third calculated value of the steering angle of the front wheel based on a rotating angle of a steering wheel and a steering gear ratio; and
    calculating a steering angle of the front wheel at a current sampling moment based on the first calculated value of the steering angle of the front wheel, the second calculated value of the steering angle of the front wheel, and the third calculated value of the steering angle of the front wheel.

2. The method for measuring and calibrating steering parameters of a vehicle according to claim 1, wherein a calculation formula of the steering angle of the front wheel at the current sampling moment is:

$$\delta_t = \delta_{t-1} + w_\theta \cdot (\delta_\theta - \delta_{t-1}) + W_a \cdot (\delta_a - \delta_{t-1}) + W\omega \cdot (\delta_\omega - \delta_{t-1});$$

where $\delta_t$ is the steering angle of the front wheel corresponding to the current sampling moment t, $\delta_{t-1}$ is the steering angle of the front wheel at a previous sampling moment t−1, $\delta_\omega$ is the first calculated value of the steering angle of the front wheel, $\delta_a$ is the second calculated value of the steering angle of the front wheel, $\delta_\theta$ is the third calculated value of the steering angle of the front wheel, $w_\omega$ is a first weighting coefficient, $w_a$ is a second weighting coefficient, and $w_\theta$ is a third weighting coefficient.

3. The method for measuring and calibrating steering parameters of a vehicle according to claim 2, wherein the first weighting coefficient, the second weighting coefficient, and the third weighting coefficient are all obtained by calculation based on inherent parameters of a vehicle yaw velocity sensor for detecting the yaw velocity of the vehicle, a vehicle lateral acceleration sensor for detecting the lateral acceleration of the vehicle, and a steering wheel rotating angle sensor for detecting the rotating angle of the steering wheel.

4. The method for measuring and calibrating steering parameters of a vehicle according to claim 3, wherein calculation formulas of the first weighting coefficient, the second weighting coefficient, and the third weighting coefficient are respectively:

$$W_\omega = \frac{S_\omega/\omega_{max}}{S_\omega/\omega_{max} + S_a/a_{max} + S_\theta/\theta_{max}};$$

$$W_a = \frac{S_a/a_{max}}{S_\omega/\omega_{max} + S_a/a_{max} + S_\theta/\theta_{max}};$$

$$W_\theta = \frac{S_\theta/\theta_{max}}{S_\omega/\omega_{max} + S_a/a_{max} + S_\theta/\theta_{max}};$$

where $S_\omega$ is a measurement standard deviation of the vehicle yaw velocity sensor, $\omega_{max}$ is a maximum absolute measurement value of the vehicle yaw angle sensor, $S_a$ is a measurement standard deviation of the vehicle lateral acceleration sensor, $a_{max}$ is a maximum absolute measurement value of the vehicle lateral acceleration sensor, $S_\theta$ is a measurement standard deviation of the steering wheel rotating angle sensor, and $\theta_{max}$ is a maximum absolute measurement value of the steering wheel rotating angle sensor.

5. The method for measuring and calibrating steering parameters of a vehicle according to claim 2, wherein the first weighting coefficient, the second weighting coefficient and the third weighting coefficient are all obtained by training a neural network model.

6. The method for measuring and calibrating steering parameters of a vehicle according to claim 5, wherein in the neural network model, initial values of the first weighting coefficient, the second weighting coefficient, and the third weighting coefficient are determined by calculation based on inherent parameters of a vehicle yaw velocity sensor for detecting the yaw velocity of the vehicle, a vehicle lateral acceleration sensor for detecting the lateral acceleration of the vehicle, and a steering wheel rotating angle sensor for detecting the rotating angle of the steering wheel.

7. The method for measuring and calibrating steering parameters of a vehicle according to claim 1, wherein calculation formulas of the first calculated value of the steering angle of the front wheel, the second calculated value of the steering angle of the front wheel, and the third calculated value of the steering angle of the front wheel are respectively:

$$\delta_\omega = \arctan\left(\frac{\omega L}{v}\right);$$

$$\delta_a = \arctan\left(\frac{aL}{v^2}\right);$$

$$\delta_\theta = \frac{\theta}{i};$$

where $\delta_\omega$ is the first calculated value of the steering angle of the front wheel, $\omega$ is the yaw velocity of the vehicle, L is the wheelbase between front wheels and rear wheels of the vehicle, v is the vehicle velocity, $\delta_a$ is the second calculated value of the steering angle of the front wheel, a is the lateral acceleration of the vehicle, $\delta_\theta$ is the third calculated value of the steering angle of the front wheel, $\theta$ is the rotating angle of the steering wheel, and i is the steering gear ratio.

8. The method for measuring and calibrating steering parameters of a vehicle according to claim 7, wherein after obtaining the steering angle of the front wheel corresponding to the current sampling moment t at each sampling moment, and the method further comprises:
performing updated calculation on the steering gear ratio for the next sampling moment t+1,
wherein an updated calculation formula of the steering gear ratio is:

$$i_{t+1} = \frac{\sum_{n=1}^{t} |\theta_n - \theta_{n-1}|}{\sum_{n=1}^{t} |\delta_n - \delta_{n-1}|};$$

where $i_{t+1}$ is the steering gear ratio at the next sampling moment t+1, n is a moment at any sampling moment, and n=1, 2, . . . , t, $\delta_n$ is the steering angle of the front wheel corresponding to the sampling moment n, $\delta_{n-1}$ is the steering angle of the front wheel corresponding to the sampling moment n−1, $\theta_n$ is the steering wheel rotating angle at the sampling moment n, and $\theta_{n-1}$ is the steering wheel rotating angle at the sampling moment n−1.

9. The method for measuring and calibrating steering parameters of a vehicle according to claim 7, wherein at each sampling moment, the method further comprises:
determining whether to perform calibration operation on a zero position of the steering wheel;
setting the rotating angle of the steering wheel at the current sampling moment as the zero position of the steering wheel if the following formula is satisfied when the vehicle is in a traveling state:

$$\begin{cases} \omega_t \times \omega_{t-1} \leq 0 \\ a_t \times a_{t-1} \leq 0 \\ |\theta_t - \theta_{t-1}| > 0 \end{cases};$$

where $\omega_t$ is the yaw velocity of the vehicle at the current sampling moment t, $\omega_{t-1}$ is the yaw velocity of the vehicle at the previous sampling moment t−1, $a_t$ is the lateral acceleration of the vehicle at the current sampling moment t, $a_{t-1}$ is the lateral acceleration of the vehicle at the previous sampling moment t−1, $\theta_t$ is the rotating angle of the steering wheel at the current sampling moment t, and $\theta_{t-1}$ is the rotating angle of the steering wheel at the previous sampling moment t−1.

10. A system for measuring and calibrating steering parameters of a vehicle, comprising:
a vehicle velocity sensor, a steering wheel rotating angle sensor, a vehicle lateral acceleration sensor and a vehicle yaw velocity sensor;
a memory; and
a processor signally connected to the memory, the vehicle velocity sensor, the steering wheel rotating angle sensor, the vehicle lateral acceleration sensor, and the vehicle yaw velocity sensor, and configured to implement the method for measuring and calibrating steering parameters of a vehicle according to claim 1 based on instructions stored in the memory.

11. The system for measuring and calibrating steering parameters of a vehicle according to claim 10, wherein the vehicle lateral acceleration sensor and the vehicle yaw velocity sensor are implemented by an inertial measurement unit.

12. The system for measuring and calibrating steering parameters of a vehicle according to claim 11, wherein the processor is signally connected to the inertial measurement unit, the vehicle velocity sensor and the steering wheel rotating angle sensor through a Controller Area Network bus.

13. An autonomous vehicle, comprising:
the system for measuring and calibrating steering parameters of a vehicle according to claim 10.

14. A computer-readable storage medium having a computer program stored thereon, wherein the program when executed by a processor implements the method for measuring and calibrating steering parameters of a vehicle according to claim 1.

* * * * *